United States Patent
Panje et al.

(10) Patent No.: US 10,070,296 B2
(45) Date of Patent: Sep. 4, 2018

(54) SYSTEM AND METHOD FOR MODIFYING DEVICE BASED ON EMERGENCY ALERT SYSTEM SIGNAL

(71) Applicant: ARRIS Enterprises LLC, Suwanee, GA (US)

(72) Inventors: Krishna Prasad Panje, Bangalore (IN); Rajesh Radhakrishnan, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/341,094

(22) Filed: Nov. 2, 2016

(65) Prior Publication Data
US 2018/0124583 A1    May 3, 2018

(51) Int. Cl.
*H04W 84/12* (2009.01)
*H04W 4/90* (2018.01)
*H04W 4/22* (2009.01)
*H04W 4/00* (2018.01)
*G08B 6/00* (2006.01)
*G08B 7/06* (2006.01)
*H04W 4/80* (2018.01)

(52) U.S. Cl.
CPC ............... *H04W 4/90* (2018.02); *G08B 6/00* (2013.01); *G08B 7/06* (2013.01); *H04W 4/008* (2013.01); *H04W 4/22* (2013.01); *H04W 4/80* (2018.02); *H04W 84/12* (2013.01)

(58) Field of Classification Search
CPC ....... H04W 4/22; H04W 4/008; H04W 84/12; G08B 7/06; G08B 6/00
See application file for complete search history.

(56) References Cited

U.S. PATENT DOCUMENTS

| 7,308,697 | B1 * | 12/2007 | Jerding | H04L 12/2801 348/E7.063 |
|---|---|---|---|---|
| 2005/0086685 | A1 * | 4/2005 | Rahman | H04L 29/06 725/33 |
| 2009/0247110 | A1 * | 10/2009 | Sennett | H04W 4/90 455/404.1 |
| 2014/0253327 | A1 | 9/2014 | Tinaphong et al. | |
| 2014/0273912 | A1 | 9/2014 | Peh et al. | |

* cited by examiner

*Primary Examiner* — Chuong A Ngo
(74) *Attorney, Agent, or Firm* — Carol J. Ansley

(57) ABSTRACT

A device is provided for use with a wireless local area network communication device and with a video display. The device includes a receiver, an image decoder, an emergency alert system (EAS) decoder, an output port, a warning generator and a LAN transceiver. The receiver receives input data including image data and EAS data. The image decoder decodes the image data into image display data. The EAS decoder decodes the EAS data into emergency alert data. The output port outputs the image display data to the video display to display a video image. The warning generator generates a warning signal based on the emergency alert data. The LAN transceiver transmits a warning transmission to the wireless local area network communication device over a local area network so as to modify operation of the wireless local area network communication device, wherein the warning transmission is based on the warning signal.

15 Claims, 4 Drawing Sheets

SYSTEM AND METHOD FOR MODIFYING DEVICE BASED ON EMERGENCY ALERT SYSTEM SIGNAL

BACKGROUND

Embodiments of the invention relate to devices and methods for communication.

The Emergency Alert System (EAS) is a national public warning system that requires broadcasters, cable television systems, wireless cable systems, satellite digital audio radio service providers and direct broadcast satellite providers to provide communications capability to address the public during a national or local emergency. Communications can include information related to national security, AMBER alerts and weather related information. As a result, the EAS can access every set top box (STB) or STB Gateway (GW) to deliver emergency information to individuals watching television. The operation of a conventional EAS system will be described with reference to FIG. 1.

FIG. 1 illustrates the operation of a conventional EAS system. As shown in the figure, a system 100 includes an EAS 102, a set top box 104 and a television 106.

Set top box 104 and television 106 are located inside a house 112, whereas EAS 102 is located outside house 112.

EAS 102 communicates with set top box 104 via a communication line 108. Set top box 104 communicates with television 106 via a communication line 110.

In operation, EAS 102 is a system that can be activated by a local official to notify residents of an emergency, such as for example an incoming hurricane. In such an emergency, it may be required that all residents evacuate or seek immediate shelter.

When EAS 102 is activated, EAS 102 provides information about the incoming hurricane to set top box 104 via communication line 108.

Set top box 104 then provides information received from EAS 102 to television 106 via communication line 110. The information sent from EAS 102 to television 106 through set top box 104 is now to be seen by the viewer on the television screen. The viewer is notified through the television screen to evacuate or seek shelter due to the impending hurricane and advised to take appropriate action.

A problem arises, though, when the viewer is unable to see the information. The problem can arise when television 106 is not on or is in sleep mode, or when the viewer is not at home, or when the viewer is at home but is not in the same location as television 106. In any of those cases, the viewer would not see the message and would not know that a hurricane was coming.

There exists a need for a more effective way to notify an individual of EAS warnings when the individual is not near a conventional EAS notification device.

SUMMARY

Aspects of the present invention are drawn to a system and method to notify an individual of EAS warnings when the individual is not near a conventional EAS notification device.

A device is provided for use with a wireless local area network communication device and with a video display. The device includes a receiver, an image decoder, an emergency alert system (EAS) decoder, an output port, a warning generator and a transmitter. The receiver receives input data including image data and EAS data. The image decoder decodes the image data into image display data. The EAS decoder decodes the EAS data into emergency alert data. The output port outputs the image display data to the video display to display a video image. The warning generator generates a warning signal based on the emergency alert data. The transmitter transmits a warning transmission to the wireless local area network communication device over a local area network so as to modify operation of the wireless local area network communication device, wherein the warning transmission is based on the warning signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

The present invention provides a device and method to notify a user of an EAS warning even if the user is not near a conventional EAS enabled device like a television or radio.

The invention provides a set top box that can connect with a wireless local area network (LAN) device to send an EAS message to the user's mobile phone. When an EAS message is provided to the set top box, the set top box converts the message to a format that is compatible with the wireless LAN device, and sends the message to the device wirelessly so the user is notified of the emergency.

The invention also provides a wireless LAN device that can receive an EAS message from a set top box and modify the operation of another wireless LAN device based on the EAS message.

Aspects of the present invention will now be described with reference to FIGS. 2-6.

Figure 1:
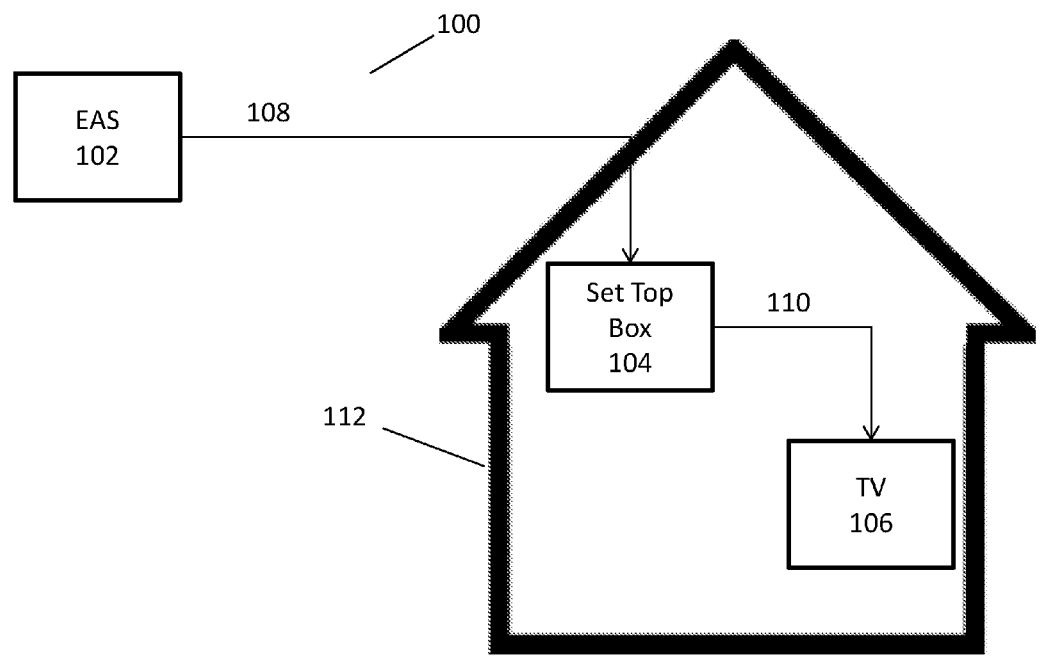
FIG. 1 illustrates the operation of a conventional EAS system.
Figure 2:
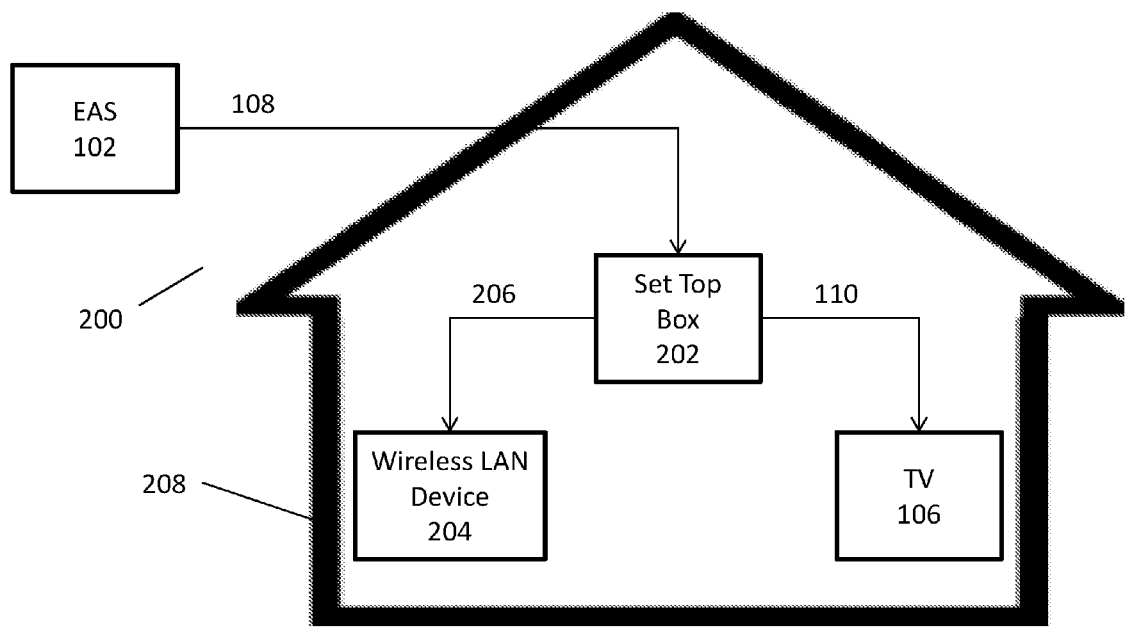
FIG. 2 illustrates the operation of an EAS system in accordance with aspects of the present invention.

FIG. 2 illustrates the operation of an EAS system in accordance with aspects of the present invention.

As shown in the figure, a system 200 includes EAS 102, a set top box 202, television 106 and a wireless LAN device 204. Set top box 202, television 106 and wireless LAN device 204 are located inside of a house 208, whereas EAS 102 is located outside of house 208.

EAS 102 communicates with set top box 202 via communication line 108. Set top box 202 communicates with television 106 and wireless LAN device 204 via communication lines 110 and 206.

Wireless LAN device 204 may include a remote control that controls other devices within a house connected to the same LAN. A non-limiting example of a wireless LAN device includes a ZigBee enabled remote control. ZigBee enabled remote control may control light switches, outlets, security cameras, HVAC systems, thermostats and any other devices within a home that can be connected to a LAN.

The operation of system 200 will be further described with reference to FIG. 6 and set top box 202 will be further described with reference to FIG. 3.

Figure 3:
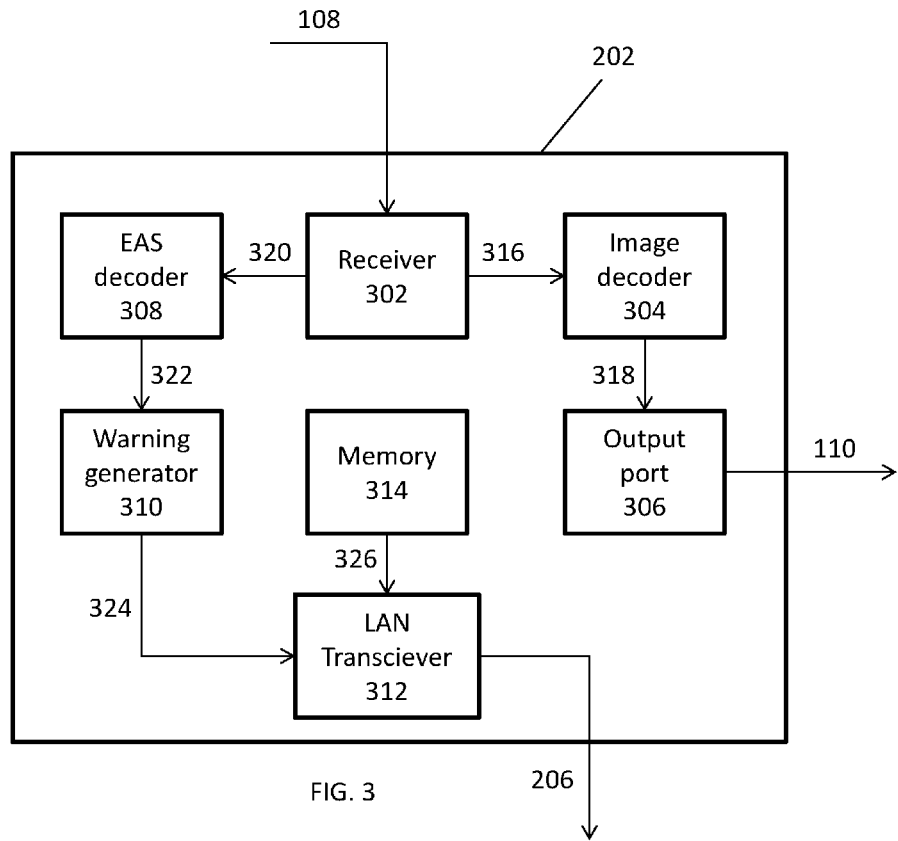
FIG. 3 illustrates a set top box in accordance with aspects of the present invention.

FIG. 3 illustrates a set top box in accordance with aspects of the present invention.

As shown in the figure, set top box 202 includes a receiver 302, an image decoder 304, an output port 306, an EAS decoder 308, a warning generator 310, a transmitter 312 and a memory 314.

Receiver 302 receives input data, which includes image data and EAS data from EAS 102 (not shown) via communication line 108. Receiver 302 then provides image data to image decoder 304 via a communication line 316. Furthermore, receiver 302 also provides EAS data to EAS decoder 308 via a communication line 320.

Image decoder 304 receives image data from receiver 302 via communication line 316. Image decoder 304 then decodes the image data into image display data and provides the image display data to output port 306 via a communication line 318.

Output port 306 receives image display data from image decoder 304 via communication line 318 and sends the image display data to television 106 (not shown) via communication line 110.

EAS decoder 308 receives EAS data from receiver 302 via communication line 320. EAS decoder 308 then decodes the EAS data into emergency alert data and provides the emergency alert data to warning generator 310 via a communication line 322.

Warning generator 310 receives emergency alert data from EAS decoder 308 via communication line 322. Warning generator 310 generates a warning signal based on the EAS data and provides the warning signal to transmitter 312 via a communication line 324.

Memory 314 stores contact information for wireless LAN device 204 and provides that contact information to transmitter 312 via a communication line 326.

LAN transceiver 312 receives a warning signal from warning generator 310 via communication line 324. LAN transceiver 312 also receives contact information for wireless LAN device 204 from memory 314 via communication line 326. Furthermore, LAN transceiver 312 then uses the contact information and sends the warning signal to wireless LAN device 204 via communication line 206.

In this example, receiver 302, image decoder 304, output port 306, EAS decoder 308, warning generator 310, LAN transceiver 312 and memory 314 are illustrated as individual devices. However, in some embodiments, at least two of receiver 302, image decoder 304, output port 306, EAS decoder 308, warning generator 310, LAN transceiver 312 and memory 314 may be combined as a unitary device. Further, in some embodiments, at least one receiver 302, image decoder 304, output port 306, EAS decoder 308, warning generator 310, LAN transceiver 312 and memory 314 may be implemented as a computer having tangible computer-readable media for carrying or having computer-executable instructions or data structures stored thereon. Such tangible computer-readable media can be any available non-transitory media that can be accessed by a general purpose or special purpose computer. Non-limiting examples of tangible non-transitory computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

The operation of set top box 202, receiver 302, image decoder 304, output port 306, EAS decoder 308, warning generator 310, LAN transceiver 312 and memory 314 will be further described with reference to FIG. 7.

Figure 4:
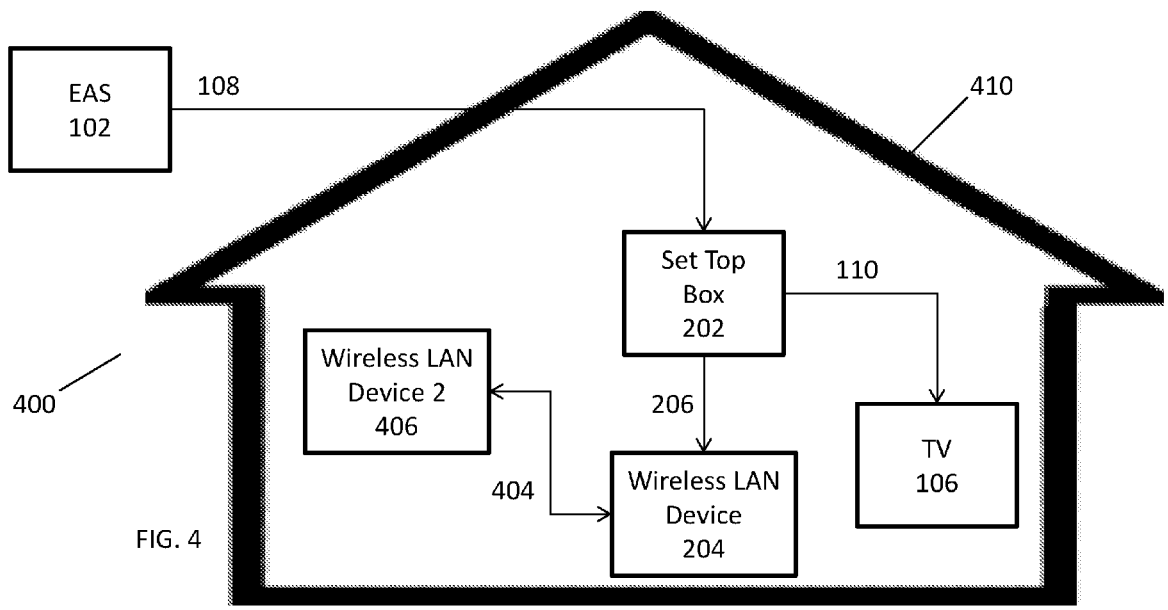
FIG. 4 illustrates the operation of another EAS system in accordance with aspects of the present invention.

FIG. 4 illustrates the operation of another EAS system in accordance with aspects of the present invention.

As shown in the figure, a system 400 includes EAS 102, set top box 202, television 106, wireless LAN device 204, and a second wireless LAN device 406. Set top box 202, television 106, wireless LAN device 204 and second wireless LAN device 406 are located inside of a house 410, whereas EAS 102 is located outside of house 410.

Second wireless LAN device 406 may be any device that is capable of communicating wirelessly with another device over a LAN. As non-limiting examples, second wireless LAN device 406 may include light switches, outlets, security cameras, HVAC systems, thermostats, and any other devices within a home that can be connected to a LAN.

Second wireless LAN device 406 and wireless LAN device 204 communicate with each other via a communication line 404. Wireless LAN device 204 can issue command instructions to second wireless LAN device 406 via communication line 404.

Referring to FIG. 4, while in this embodiment the first wireless LAN device 204 communicates with the second wireless LAN device 406, those skilled in the art would understand that set top box 202 might alternatively be able to communicate with second wireless device 406 directly. A set top box gateway (not shown) may have interfaces to multiple LANs, some examples being: Wi-Fi, Wi-Gig, Zigbee, RF4CE, Bluetooth, Bluetooth LE.

The operation of system 400 will be further described with reference to FIG. 6.

Figure 5:
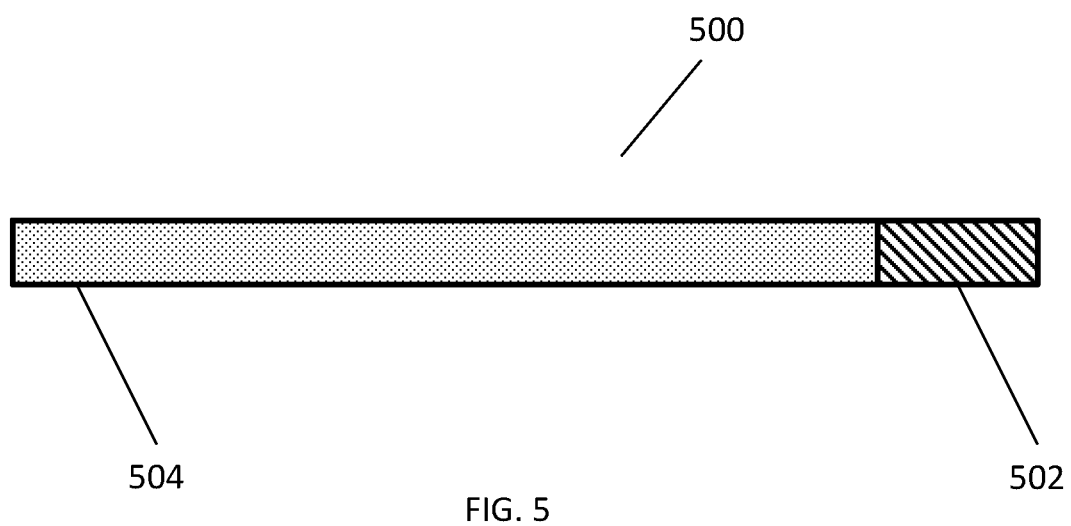
FIG. 5 illustrates a data packet to deliver instructions in accordance with aspects of the present invention.

FIG. 5 illustrates a data packet to deliver instructions in accordance with aspects of the present invention.

As shown in the figure, a data packet 500 includes an overhead data 504 and a payload 502.

Overhead data 504 may include information such as the source and destination of data packet 500. This information is typically only provided to make sure data packet 500 reaches the correct destination. Once data packet 500 reaches the correct destination, overhead data 504 is stripped from the packet.

Payload 502 includes the desired information sent in data packet 500. As a non-limiting example, payload 502 may include instructions to modify the operation of a device.

Data packet 500 will be further described with reference to FIG. 6.

Figure 6:
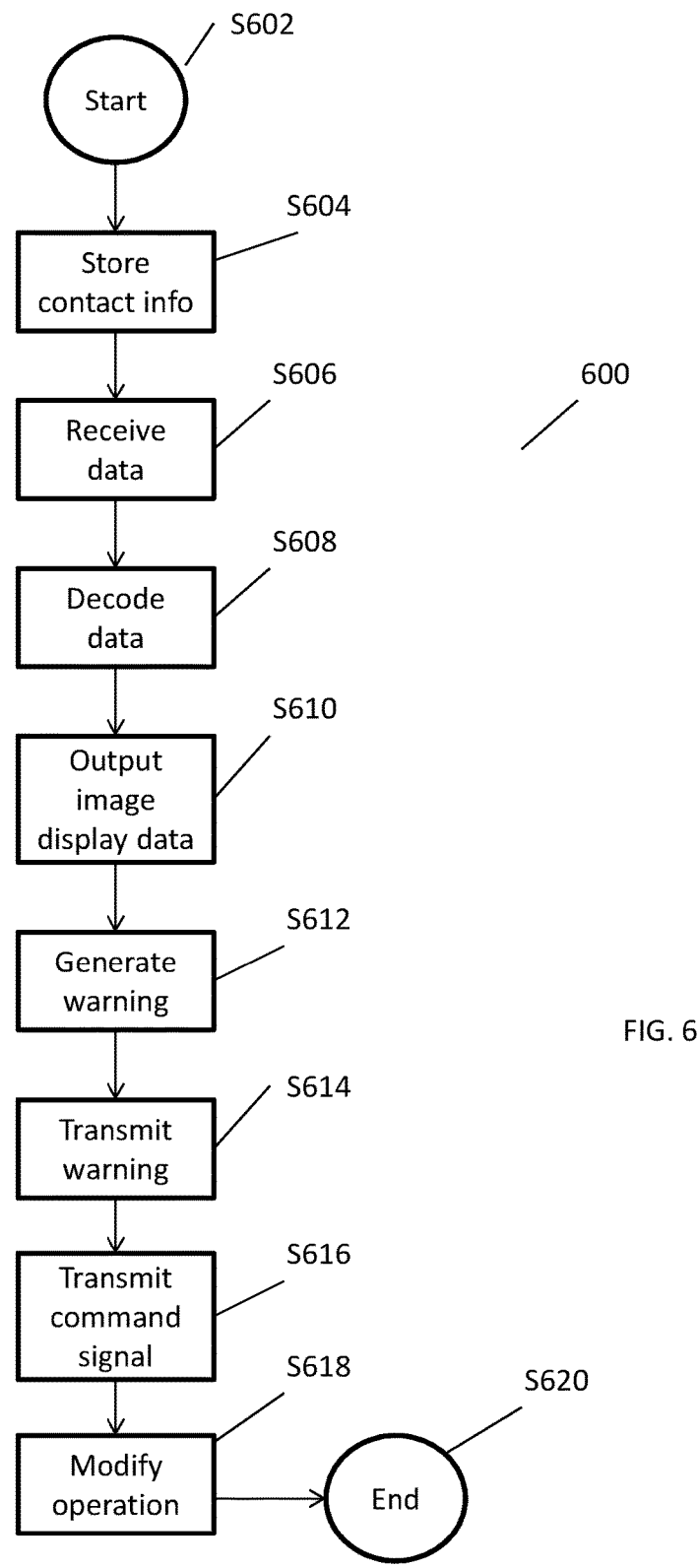
FIG. 6 illustrates a process by which a user is notified of an EAS warning in accordance with aspects of the present invention.

FIG. 6 illustrates a process by which a user is notified of an EAS warning in accordance with aspects of the present invention.

As shown in the figure, a process 600 starts (S602) and contact information is stored (S604).

Referring to FIG. 3, memory 314 stores contact information for wireless LAN device 204 (not shown). Storing this information may be done in a variety of ways. The user may store the information on set top box 202 via a graphical user interface on television 106 (not shown). The user may also store the information online via the cable service's website, where the information entered on the website is then uploaded to memory 314. In general, the user may store the contact information via any known means for storing contact information. The information may include, but is not limited to, the IP address of wireless LAN device 204.

Returning to FIG. 6, data is then received (S606).

Referring to FIG. 2, as a non-limiting example, the state government may have initiated EAS 102 because a hurricane is coming and the residents need to be informed. EAS 102 sends input data regarding the hurricane to set top box 202 via communication line 108.

Referring now to FIG. 3, receiver 302 receives the input data via communication line 108. The input data includes image data for display on a television screen and EAS data. Receiver 302 sends the image data to image decoder 304 via communication line 316. Receiver 302 also sends the EAS data to EAS decoder 308 via communication line 320.

Returning to FIG. 6, data is then decoded (S608).

Referring to FIG. 3, image decoder 304 decodes the image data to create image display data that is in the appropriate format for viewing on a television. Image decoder 304 then sends the image display data to output port 306 via communication line 318. Any known method of decoding can be used to decode the data to the appropriate format.

EAS decoder 308 decodes the EAS data into emergency alert data that is in the appropriate format to be received by a wireless LAN device. EAS decoder 308 then sends the emergency alert data to warning generator 310 via communication line 322. Any known method of decoding can be used to decode the data to the appropriate format.

Returning to FIG. 6, an image display data is transmitted to the attached display device, if any (S610).

Referring to FIGS. 2 and 3, output port 306 sends image display data to television 106 via communication line 110. At this point, the emergency alert is displayed on television 106. If the user were to be watching television, the user would see the alert notification and would be advised to take cover or evacuate the area before the hurricane arrives. However, the television may not be on, or the user may be in a different room at the time the alert is displayed and he may not actually receive the alert as intended.

Returning to FIG. 6, a warning is generated (S612).

Referring to FIG. 3, warning generator 310 generates a warning signal based on the emergency alert data and sends the warning signal to LAN transceiver 312 via communication line 324.

Returning to FIG. 6, a warning is transmitted (S614).

Referring to FIGS. 2 and 3, LAN transceiver 312 uses contact information from memory 314 to transmit the warning signal to wireless LAN device 204 via communication line 206. In case television 106 is not on, or in case the user is in a different room at the time the emergency alert is displayed on the television, the user would not see the alert. However, it is likely that the user has wireless LAN device 204 at home where the warning signal would reach wireless LAN device 204 and notify the user of the incoming hurricane. The warning signal may include audio data, like an alarm or buzzing sound, or even a recorded audio message telling the user to take cover or evacuate. The warning signal may also include text data, like a written warning to alert the user to take cover or evacuate, or tactile data, like a vibration.

Returning to FIG. 6, a command signal is transmitted (S616).

Referring to FIGS. 4 and 5, wireless LAN device 204 creates data packet 500 to transmit to second wireless LAN device 406. Data packet 500 will include overhead data 504 that includes contact information for second wireless LAN device 406 to ensure data packet 500 reaches second wireless LAN device 406. Data packet 500 also includes payload 502, which is the command signal for second wireless LAN device 406 based on the warning signal. As a non-limiting example, second wireless LAN device 406 may be hurricane shutters that are designed to cover a home's windows and protect the windows from shattering under strong winds. In this case, payload 502 may include a command signal that would instruct the hurricane shutters to close and protect the home.

Once data packet 500 is created, wireless LAN device 204 sends data packet 500 to second wireless LAN device 406 via communication line 404.

Returning to FIG. 6, an operation is modified (S618).

Referring to FIGS. 4 and 5, second wireless LAN device 406 receives data packet 500, strips overhead data 504 and only remains with payload 502. The command signal of payload 502 informs second wireless LAN device 406 to close its hurricane shutters. In this example, second wireless LAN device 406 is referred to as hurricane shutters. Second wireless LAN device 406 then executes the instruction provided by payload 502 by covering all windows, resulting in house 410 being protected from the incoming hurricane.

In another embodiment, even though second wireless device 406 properly receives payload 502, it may be impossible to execute the instruction. There may be debris that prevents the shutters from closing, or the shutters' motor may be malfunctioning. In either case, second wireless device 406 would then generate a failure signal and send the failure signal to wireless LAN device 204 via communication line 404 and wireless LAN device 204 would then notify the user that the shutters malfunctioned by providing an audible, text or tactile warning. Wireless LAN device 204 could additionally or alternatively notify the set top box 202 of the failure. Set top box 202 would display that alert to the user by sending visual and/or audible information display 106 over communication line 110.

In yet another embodiment, second wireless LAN device 406 may not receive payload 502. In that case, wireless LAN device 204 would notify the user that the shutters did not receive the instruction to close by providing audible, text, or tactile warning. Wireless LAN device 204 could additionally or alternatively notify the set top box 202 of the failure. Set top box 202 would display that alert to the user by sending visual and/or audible information display 106 over communication line 110.

Returning to FIG. 6, process 600 ends (S620).

In summary, the present invention provides a device and method to receive EAS warnings and effectively communicate the warnings to individuals not near a conventional EAS equipped device like a television or a radio. The present invention also provides a device and method to modify the operation of a wireless LAN device in response to EAS warnings.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a wireless local area network communication device and for use with a video display operable to display a video, said device comprising:
    a receiver operable to receive input data including image data and emergency alert system data, wherein the emergency alert system data includes encoded text data,
    an image decoder operable to decode the image data into image display data;
    an emergency alert system decoder operable to decode the emergency alert system data into emergency alert data, wherein said emergency alert system decoder is operable to decode the encoded text data into decoded text data;
    an output port operable to output the image display data to the video display to display a video image;
    a warning generator operable to generate a warning signal based on the emergency alert data; and
    a transceiver operable to transmit a warning transmission to the wireless local area network communication device over a local area network so as to modify operation of the wireless local area network communication device, said warning transmission being based on the warning signal and said warning transmission including a text instruction based on the decoded text data.

2. The device of claim 1, wherein said transceiver is operable to transmit the warning transmission to the wireless local area network communication device so as to modify operation of the wireless local area network communication device in one of a manner selected from the group consisting of turning off, turning on, modifying a visual indicator, modifying an audio indicator and modifying a tactile indicator.

3. The device of claim 1, wherein said transceiver is operable to transmit the warning transmission to the wireless local area network communication device such that the wireless local area network communication device transmits a command signal to modify operation of a second wireless local area network communication device.

4. The device of claim 3, wherein said transceiver is operable to transmit the warning transmission to the wireless local area network communication device so as to modify operation of the wireless local area network communication device in one of a manner selected from the group consisting of modifying a visual indicator, modifying an audio indicator and modifying a tactile indicator when the second wireless local area network communication device fails to receive the command signal.

5. The device of claim 1, wherein said transceiver is operable to transmit the warning transmission as one of the group consisting of a Wi-Fi signal, an RF4CE signal, a Wi-Gig signal, a Zigbee signal, a Bluetooth signal and a Bluetooth Low Energy signal.

6. A method of using a wireless communication device and a video display operable to display a video, said method comprising:
    receiving, via a receiver, input data including image data and emergency alert system data wherein said the emergency alert system data includes encoded text data;
    decoding, via an image decoder, the image data into image display data;
    decoding, via an emergency alert system, the emergency alert system data into emergency alert data, wherein said decoding the emergency alert system data into emergency alert data comprises decoding the encoded text data into decoded text data;
    outputting, via an output port, the image display data to the video display to display a video image;
    storing, into a memory, contact information associated with the wireless communication device;
    generating, via a warning generator, a warning signal based on the emergency alert data; and
    transmitting, via a transceiver, a warning transmission to the wireless local area network communication device over a local area network so as to modify operation of the wireless local area network communication device, the warning transmission being based on the warning signal, wherein said warning transmission includes a text instruction based on the decoded text data.

7. The method of claim 6, wherein said transmitting a warning transmission comprises transmitting the warning transmission to the wireless local area network communication device so as to modify operation of the wireless local area network communication device in one of a manner selected from the group consisting of turning off, turning on, modifying a visual indicator, modifying an audio indicator and modifying a tactile indicator.

8. The method of claim 6, wherein said transmitting a warning transmission comprises transmitting the warning transmission to the wireless local area network communication device such that the wireless local area network communication device transmits a command signal to modify operation of a second wireless local area network communication device.

9. The method of claim 8, wherein said transmitting a warning transmission comprises transmitting the warning transmission to the wireless local area network communication device so as to modify operation of the wireless local area network communication device in one of a manner selected from the group consisting of modifying a visual indicator, modifying an audio indicator and modifying a tactile indicator when the second wireless local area network communication device fails to receive the command signal.

10. The method of claim 6, wherein said transmitting the warning transmission comprises transmitting the warning transmission as one of the group consisting of a Wi-Fi signal, an RF4CE signal, a Wi-Gig signal, a Zigbee signal, a Bluetooth signal and a Bluetooth Low Energy signal.

11. A non-transitory, tangible, computer-readable media having computer-readable instructions stored thereon, for use with a wireless communication device and a video display operable to display a video, the computer-readable instructions being capable of being read by a computer and being capable of instructing the computer to perform the method comprising:
    receiving, via a receiver, input data including image data and emergency alert system data, wherein said emergency alert system data includes encoded text data;

decoding, via an image decoder, the image data into image display data;

decoding, via an emergency alert system, the emergency alert system data into emergency alert data, said decoding the emergency alert system data into emergency alert data comprises decoding said encoded text data into decoded text data;

outputting, via an output port, the image display data to the video display to display a video image;

storing, into a memory, contact information associated with the wireless communication device;

generating, via a warning generator, a warning signal based on the emergency alert data; and transmitting, via a transceiver, a warning transmission to the wireless local area network communication device over a local area network so as to modify operation of the wireless local area network communication device, the warning transmission being based on the warning signal and said transmitting the warning transmission comprises transmitting the warning transmission including a text instruction based on said decoded text data.

12. The non-transitory, tangible, computer-readable media of claim 11, wherein the computer-readable instructions are capable of instructing the computer to perform the method such that said transmitting a warning transmission comprises transmitting the warning transmission to the wireless local area network communication device so as to modify operation of the wireless local area network communication device in one of a manner selected from the group consisting of turning off, turning on, modifying a visual indicator, modifying an audio indicator and modifying a tactile indicator.

13. The non-transitory, tangible, computer-readable media of claim 11, wherein the computer-readable instructions are capable of instructing the computer to perform the method such that said transmitting a warning transmission comprises transmitting the warning transmission to the wireless local area network communication device such that the wireless local area network communication device transmits a command signal to modify operation of a second wireless local area network communication device.

14. The non-transitory, tangible, computer-readable media of claim 13, wherein the computer-readable instructions are capable of instructing the computer to perform the method such that said transmitting a warning transmission comprises transmitting the warning transmission to the wireless local area network communication device so as to modify operation of the wireless local area network communication device in one of a manner selected from the group consisting of modifying a visual indicator, modifying an audio indicator and modifying a tactile indicator when the second wireless local area network communication device fails to receive the command signal.

15. The non-transitory, tangible, computer-readable media of claim 11, wherein the computer-readable instructions are capable of instructing the computer to perform the method such that said transmitting the warning transmission comprises transmitting the warning transmission as one of the group consisting of a Wi-Fi signal, an RF4CE signal, a Wi-Gig signal, a Zigbee signal, a Bluetooth signal and a Bluetooth Low Energy signal.

* * * * *